Dec. 4, 1945.   A. G. LIEBMANN   2,390,109
AIRPORT LANDING SIGNAL APPARATUS
Filed Oct. 20, 1942   2 Sheets-Sheet 1
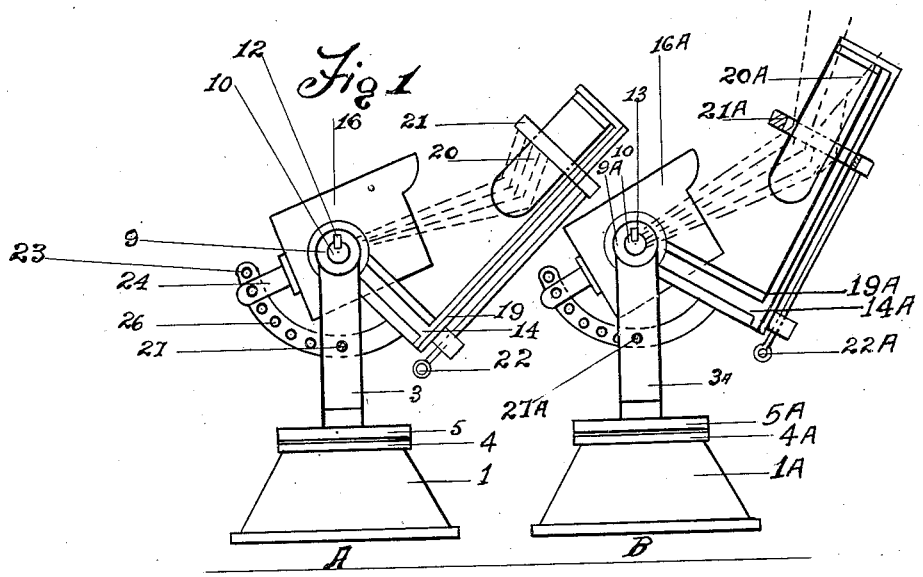
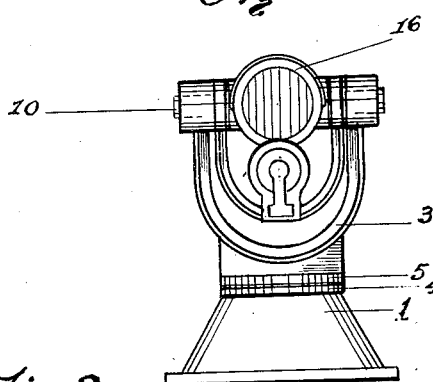
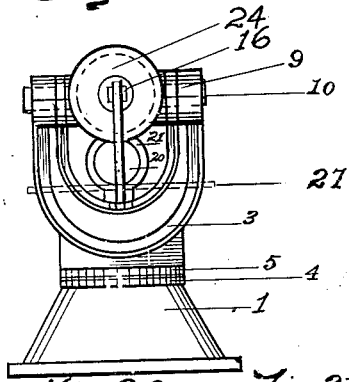
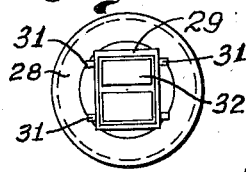
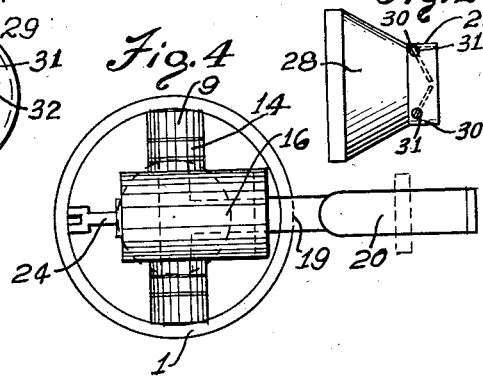
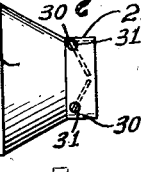
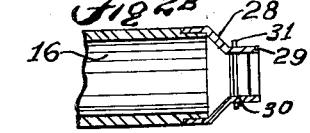
August G. Liebmann
Inventor

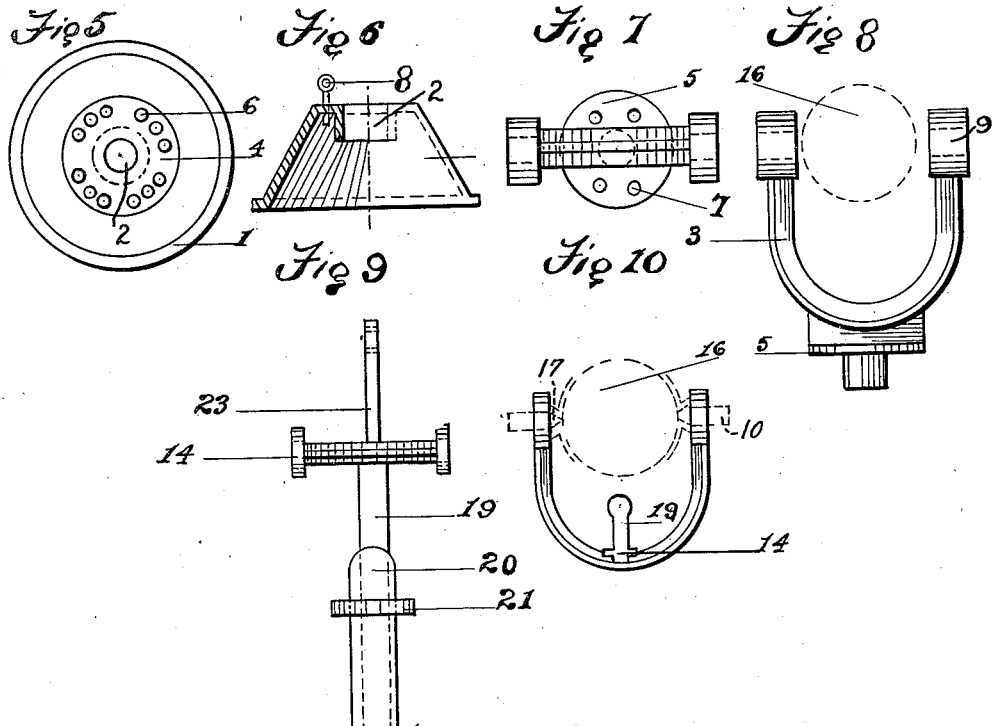
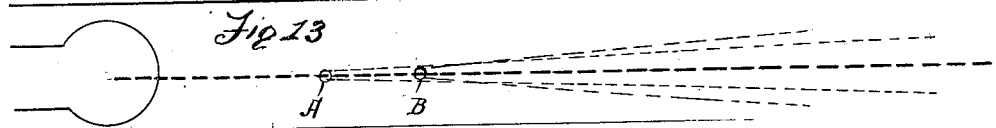
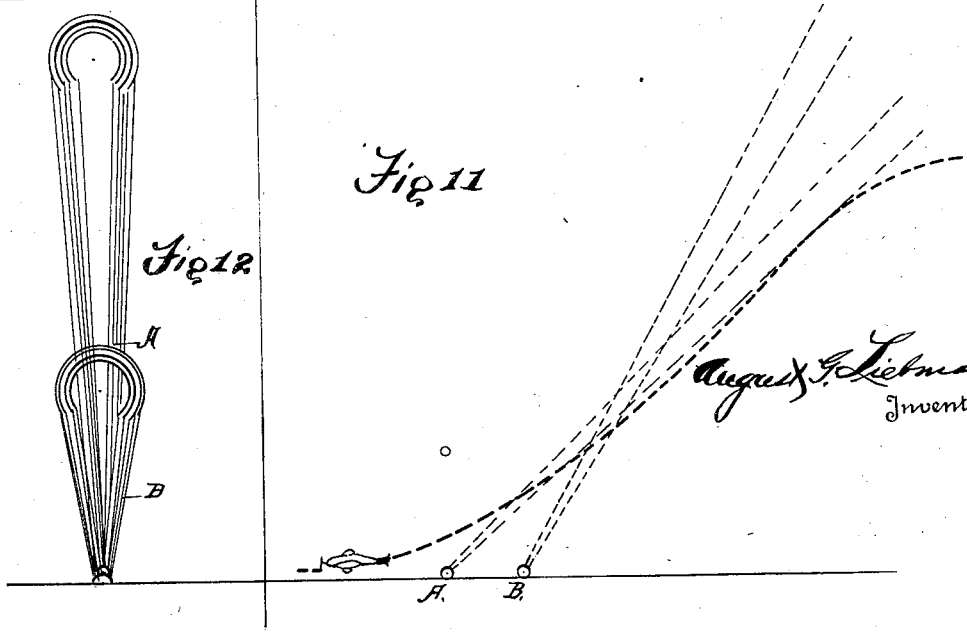

Patented Dec. 4, 1945

2,390,109

UNITED STATES PATENT OFFICE 2,390,109

AIRPORT LANDING SIGNAL APPARATUS

August G. Liebmann, Washington, D. C., assignor of one-half to Harry A. Blessing, Washington, D. C.

Application October 20, 1942, Serial No. 462,772

3 Claims. (Cl. 177—352)

The present invention relates to improvements in aeronautical auxiliaries, or an airport landing signal apparatus.

Primarily a guiding light for aircraft of any and all types, under conditions of fair or foul weather.

Instrument failures, continue to persist, and failures require emergency measures as disclosed in the present invention, it is common knowledge to airplane pilots, that the conventional search light crosses in the sky, radiate a light intensity at such intersections, giving to the pilot the aspect of a star or other heavenly body, adding to confusion even in clear weather, and often causing flight away from, instead of to, the field.

In periods of fog, mist and low visibility, the problem of landing, even with the most modern instruments is hazardous.

In many parts of the world where air transport traffic is heavy, fog prevails 25 to 30 percent of the total hours of the year. Electronic devices are being invented and tried out, with some degree of success, yet that also is in its experimental infancy.

The primary object of the present invention is to provide a simple mobile means, to assist the location of an airport and landing craft on the runways of such port when all other means have ceased to function.

The purpose of the present invention is to assist the aircraft in effecting a landing on airport runways, or water surfaces, roof tops or landing stages of any and all kinds.

A further object is to provide a projected beam, having a definite configuration to positively identify it as a legitimate signalling means, and means in conjunction with the projected beam to so manipulate the rays of light of the beam to transmit by blinking methods, the usual code signals.

The annexed drawings illustrate the invention:

Figure 1 shows the apparatus, as a projector designated "A" and a projector designated "B"; for the difficult operation of landing aeroplanes in foggy and stormy weather. The view in Figure 1, illustrates a side elevation of the apparatus in tandem relationship, the operation of which is hereinafter described.

Figure 2 is a front elevation of one of the projectors, either "A" or "B," which are similar in general respects, the differentiating features residing in means to control the reflection of beams, hereinafter described.

Figures 2A and 2B are modified forms of a projector hood, and shutter to control and confine the rays from the projector upon the reflector.

Figure 2C is a top plan view of the projector hood.

Figure 3 illustrates a rear elevation of Fig. 2.

Figure 4 illustrates a top plan view of one of the projectors, A. or B, shown in Figs 2 and 3.

Figure 5 illustrates a top plan view of the supporting base upon which the assembled projector and reflector is mounted for movement laterally and vertically of its horizontal base.

Figure 6 illustrates an elevation, partly in section of the said base, shown in Fig. 5.

Figure 7 is a top plan view of the yoke, adapted to carry the assemblage; thus providing lateral movement for the projector, as well as vertical movement for the same with respect to the reflector adjusted to form a beam, and also the vertical adjustment of such formed beam.

Figure 8 is an illustration of the element shown in Fig. 7, showing an elevation thereof.

Figure 9 is a top plan view of the reflector carriage, with a cylindrical reflector at one end thereof; the reflector is constructed preferably of a metallic shell, highly polished silver plate or porcelain enameled. The reflector carriage is provided with a quadrant bar at its end opposite to the reflector, provided with apertures to receive adjusting pin, to adjust the carriage with respect to the projector as well as secure the same in fixed position to the yoke, and for holding the same in such fixed adjusted position.

Figure 10 illustrates an elevation of Fig. 9, with the reflector omitted, but showing the supporting guide for the reflector, as well as the related position of the projector in dotted outline.

Figure 11 illustrates a schematic drawing of an approximate related mounting and position for projecting the beams, as outlined in Fig. 1.

Figure 12 is a front elevation of schematic drawing outlined in Figure 11.

Figure 13 illustrates relationship in plan of the positions as outlined in Figures 11 and 12.

The horizontal base to support the apparatus may be, a landing field, a harbor barge or wharf on a pier head, for landing hydroplanes. In the arrangement shown in Figure 1, for landing other types of craft, the use of only one assembly A or B may be used as hereinafter described.

Reference now being had to the numerals:

As outlined in Figure 1, the apparatus thus comprises the base I and IA, adapted to be set in a fixed position for directional movement of projected beams, or in temporary fields, it may be mounted on trucks for movement about a landing field.

The base is provided with sockets 2 (see Figures 5 and 6) adapted to support the yokes 3 for lateral swivelling movement of said yokes with respect to said base.

The base pieces are provided with bearings 4 adapted to support the bearings 5 integral of the said yokes. The apertures in series designated 6 of the base and 7 of the yoke bearings, serve to register and provide means for locking the bearings in their predisposed swivelling adjustment when the pin 8 is inserted into selected and registered apertures of the bearings.

The yokes 3 (Fig. 8) are provided with apertures 9, see Fig. 3, adapted to receive a series of trunnions 10, the latter are keyed to the yokes by means of slots and keys 12 and 13, Fig. 1, and these trunnions also support the reflector carriages 14 and 14A; projectors 16 and 16A; which have means therein commonly known as parabolic mirrors in the prior art.

These projectors are pivotally mounted on the said trunnions 10, Figure 1, the inner ends of such trunnion shafts tapered to interfit with sockets 17 and 17A of the projector housing.

The reflector carriage 14 also carried by these trunnions, for independent swinging movement, is held in relationship and prevented from movement by means hereinafter described.

Fixed to the lower end of the carriage yoke 14 are the guides 19 (see Fig. 10, et seq.), and superimposed upon these guides for adjustability with relation to the projector and the horizon are the reflectors 20, which as before stated are preferably made from metal shells, with highly polished reflecting surfaces, therefore opaque and the light does not pass through them.

The said reflector 20 is held in proper relationship to reflect a beam of light from the projector by means of the quadrant bar of the reflector carriage, designated 23; and the lever arm of the projector 24, both elements provided with apertures adapted to register for selective adjustment, and fixing the same by means of a pin 27 and 27A passing through the apertures of the quadrant bar 24 and 24A and the yoke 3, as shown in Figs. 1, 2, 3, et seq. Thus by these elements the projector may be adjusted to project a beam upon the reflector and such reflected beam, held in elevated position to the horizon, or swung laterally in a circle.

The apparatus is operated as follows, reference being had to Figure 1; for the most difficult landing of aeroplanes in a fog, see Figure 1, the assemblage A is arranged for projecting a beam at low angle with relation to the horizon; and the assemblage B is set for projecting a beam at a high angle with reference to the horizon.

These projected angles intersect substantially as outlined in Figure 11. The real object of such intersection is to simulate the gliding flight in landing, provided by two crossed beams, but as previously pointed out, the crossing of search light beams, fails to contribute the desired result in many cases even in fair weather, by reason of the intersection of beams contributing a point intensity of light which is easily mistaken for a star or similar astral phenomena, instead of an airport guiding or assistance signal.

The projected beams of the present invention clearly obviate this contingency, due to the swollen condition of the A beam at its point of intersection with the B beam; and furthermore the aspect of the ends of both beams which indicate a bow effect, or horseshoe shape with high light peripherial contour and dark center, thus contributing a defined conclusion as to the general aspect of the beams viewed at sides or ends, that they are signalling lights for the uses and purposes of landing aircraft. Thus the confusion incidental to ordinary search light beams is eliminated.

Furthermore the means to deliver code signals from the ends of the said projected beams of light to assist a pilot in landing aircraft, is provided by the within described invention.

In operation the high angle beam identifying a landing field by means of the end configuration of the beam, such as the bow of a banded structure of high and low lights; and the beams as shown in Figure 11, to assist gliding flight and set down of plane upon a runway of the field. In operating an aeroplane the craft follows down the under side of the A and B beams. In operation for helicopters, such craft may fly down on the inside or interior of the funnel shaped beam, and may be guided by either the A projector or the B projector set at proper angle. With aeroplanes, however, speed is essential to lift and the velocity of landing is relatively high speed, therefore such craft fly on the outer and under side of the beam and not through the channel of darkened interior just mentioned.

As an outpost marker for determination of distance to the landing field, the beam is used at a high angle, and usually at such fixed signals or signals of fixed location indicating the conditions of approach flight, changed to gliding flight, preparatory to landing; as well as the combined signals as shown in Figure 1, and Figures 11, 12 and 13, for change from gliding flight to landing flight following the beam, beneath the same.

In the matter of signalling to guide the pilot to make use of the beams in any case, reference is made to the damper mechanisms of the apparatus, viz:

At the lower extremity of the carriage yoke 14, the guide 19, fixed thereto, upon which the reflector is suitably attached, in adjustable relationship to the source of light for the reflection of such a beam as outlined.

Mounted for slidable movement upon the guides 19, are the discs or rings called dampers 21 and 21A; adapted to be slid, to and fro by means of the push and pull rods 22, which are manually operated by the ground attendant of the ground forces.

These damper mechanisms are operated as follows, to provide blinking signals of communication to the incoming pilot desiring to land his craft.

In the assemblage of projector designated A, the damper 21, slidably mounted upon the guide 19, interfits with the reflector surface 20, as a collar, and of sufficient height to intercept the reflected rays, so that when the damper is moved toward the source of light a portion of the rays will be prevented from maturing into a full beam of reflection, and when moved away to permit an increase in volume or maturity of reflection; thus the mature reflection of maximum volume flows over the outside edge of the damper; by moving the damper 21 to and fro, the maturity of a full beam is altered, and in sequence the scope of the beam increased or decreased.

By rapid movement of the damper to and fro, the intermittent interference of blocking, shading or damping the waves, causes an optical effect in the ends of such a beam, similar to scintillation; or interchange of high and low lights of the banded structure of the contour, of the visible section of the end of the beam, which is in elevation for that purpose.

The banded structure is similar, somewhat in form to rainbow or fog-bows of nature.

The fact that the damper closely fits the reflector, no light can pass when completely blocked by the damper, in such case an alternate blocking of the flow of light will simulate the aspect of puffs of smoke rings, this damper is of greatest value in minimizing light, yet rendering effective signalling in the setting down of planes on the runway.

In the assemblage of the projector designated B, with the damper 21A, mounted with similar elements, except and provided however that the damper does not cut off the flow of light, completely at any time; owing to the annular slot on the inner edge of the disc or collar which allows some light to pass through on the surface of the reflector in addition to the blocking and damping of the light waves as outlined in the foregoing.

The light waves passing through this slot or air gap as well as over the edges inside and outside of the disc, thus a code signal blinking effect may be had, in addition to the natural scintillation of the high and low lights in the banded structure of the end of the beams as elevated for that purpose.

The optical effects may be designed as blinking or rippling the ends, in elevation, of the said beams.

With reference to Figures 2A, 2B, and 2C, which are modified forms of a projector hood, previously noted; with shutter to control and confine the rays from the projector upon the reflector.

Figure 2A is a front elevation of the projector hood; Fig. 2B is a side elevation in section of the longitudinal axis of the said projector hood; Figure 2C is a top plan view of the projector hood.

Reference being had to these numerals of the corresponding figures, the hood interfits and is held by friction hold with the end of the projector 16; this hood 28 is of frustro-conical form and its outer end terminal is provided with an open end rectangular box like extension 29, provided with apertures 30 adapted to receive shutter lugs 31 of the shutters 32.

In operation the shutters being of thin metal plate they are adjusted and held in fixed adjusted position by bearing down on the lugs 31 while swinging the shutters 32 to any desired open or closing positions.

Manual pressure being applied to the lugs 31 of the shutters 32; flexes the shutter which acts as a spring to hold itself in any precise position when the pressure is relieved, thus simultaneously pressing upon the lugs and turning or swinging the shutter as a door, the inherent flexibility of the shutter holds it at any desired point of adjusted open or closed position, when the pressure on the lug is relieved.

What is claimed as new is:

1. An airport landing signal for guiding airplanes, to the landing field, comprising a light source, a reflector, a projector for projecting a light from said source onto the reflector; the same being shaped to produce by reflection a beam of light having a voided interior and a high light exterior; means cooperating with the reflector adapted to alternately extend or curtail the reflected rays emanating therefrom; the said means serving the dual purpose of rendering a blinking or rippling effect with respect to the visible light of the elevated end of the beam; means for mounting the said light source projector and reflector and means cooperating therewith for adjusting the beam laterally with respect to its horizontal base and vertically with respect to the horizon.

2. An airport landing signal for guiding aircraft, comprising a light source, a projector and reflector; the light source projector adapted to project light from said source upon the reflector; to produce a reflected beam of light having a voided interior and a high light exterior; the elevated terminus of the beam having an arcuated aspect of a banded structure of high and low lights; means cooperating with the reflector causing a contractile and expansile intermittent and alternate interposition of the bands of the said high and low lights of the said arcuated aspect of the terminus of the beam, or blinking or rippling effect thereof; means for supporting the light source projector and the reflector and adjustable means in cooperation therewith to project said beam laterally and vertically with respect to its horizontal base.

3. An airport landing signal unit as in claim 1 and a second signal unit substantially similar to the first signal unit for cooperation with the first signal unit, one of said units being adjusted to project a light beam at a low angle and the other at a high angle, the units being positioned so that the beams intersect.

AUGUST G. LIEBMANN.